United States Patent Office 3,167,249
Patented Jan. 26, 1965

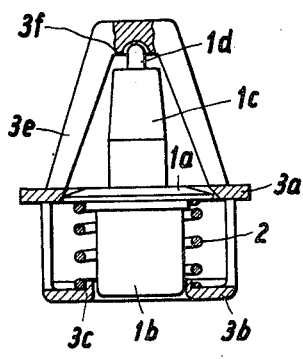
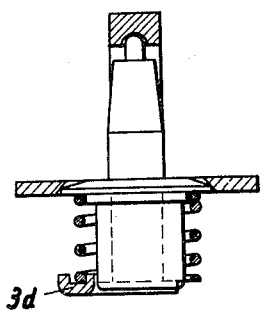
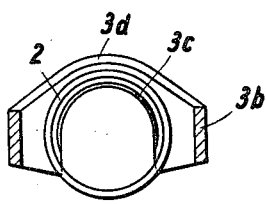
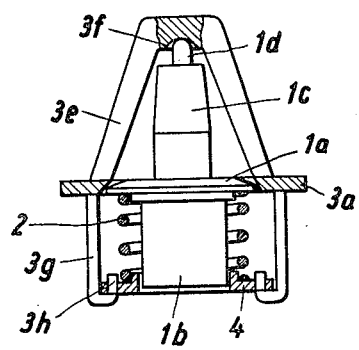
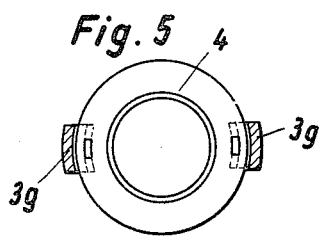
Inventors
ALEX MOOSMAYER
ULRICH EBERT
by Howson and Howson

3,167,249
THERMOSTATICALLY CONTROLLED VALVES
Alex Moosmayer and Ulrich Ebert, Heidelberg, Pfaffengrund, Germany, assignors to Mecano-Bundy G.m.b.H., Heidelberg (Neckar), Germany, a joint-stock company
Filed Mar. 14, 1963, Ser. No. 265,139
Claims priority, application Germany, Mar. 17, 1962, M 52,164
2 Claims. (Cl. 236—34)

The invention relates to a thermostatically controlled valve such as is used more particularly for temperature regulation of the cooling fluid in motor vehicle engines. In such thermostatic valves, generally a valve member constructed as a disc is pressed by spring pressure against a seat ring, the closing spring bearing at one end on the valve disc and at the other end on a bowed member connected to the valve seat ring, the said member comprising centrally an opening for guiding the valve member. Situated at the side of the seat ring opposite from the spring abutment is a stationary abutment, which is generally connected by a bridge to the seat ring, for the plunger of a thermostatic element combined with the valve disc. On heating, an expansible material within the thermostatic element effects forcible axial relative displacement of the projecting plunger which by the pressure on its abutment lifts the valve member. In known constructions, the three parts: valve seat ring, upper bowed and lower bowed member, are punched individually from sheet metal, for example brass sheet 1 mm. in thickness. At assembly with the other parts of the valve, they are assembled together under spring pressure, and prongs have to be inserted in housing holes. Furthermore, the parts which are kept under preload must be introduced into a rivetting device in order that the prongs can be riveted. Generally these rivetted connections are also soldered, since the motor car industry has prescribed in many cases that rivetted points at the connection of the lower and upper bowed members to the valve seat ring must be additionally soldered, since the forces occurring at the connection points are very considerable in relation to the small rivet heads. A brass plate of 1 mm. in thickness permits of the formation of only a relatively inadequate fastening head.

The object of the invention is to substantially cheapen the hitherto expensive production of the frame, to simplify the assembly of all the individual parts of the entire valve, and to accelerate assembly and increase working reliability.

According to the invention, there is provided a thermostatically controlled valve in which a disc like member is displaced away from a cooperating seat ring by a plunger which is forcibly extended from a thermostatic element carried on the disc like member above a predetermined temperature, and in which the disc like member is urged against the seat ring by a resilient means mounted on a support, the seat ring being integral with a frame on one side of the ring for providing an abutment for the plunger and with a support for the resilient means on the other side. The support which is made in one piece with the valve seat ring and the bridge forming the plunger abutment, and which is provided for the closing spring, can be in the form of a bridge with a circular guide opening which is concentric with the valve axis and is recessed to the opening width at one side transversely to the length of the bridge, the remaining part of the opening periphery having a raised rim for centering of the closing spring.

In another embodiment the closing spring holder which is made in one piece with the valve seat ring and the bridge forming the push pin abutment is formed by two or three downwardly directed struts which at their lower end terminate in inwardly directed hooks. Suspended in the hooks is an annular disc which forms the spring abutment and whose aperture rim is raised for centering the closing spring, the hooks engaging in slot-like holes on the edge of the disc.

The combination of the three parts of the frame to form a single element reduces the original cost of the frame to one-third at once. The parts hitherto stamped from brass sheet can be made as an aluminium pressure casting. The tool costs for the pressure casting mould amount to only a seventh of the tool costs for the punched parts. Tests have also shown that solder, as used in the past, is dissolved in a short time by cooling water mixed with anti-freeze substances.

Assembly of the valve is now considerably simpler. The frame, which in the old constructional form could only be connected after the insertion of the thermostatic valve element and closing spring, is prefabricated in one piece according to the present invention, and the invention permits of the subsequent insertion of the element which is introduced with the push pin of the thermostatic element leading first of all in inclined fashion through the opening of the valve seat ring, and then rectilinearly, whilst the closing spring, with its abutment disc in the case of the second embodiment, is pressed against the valve disc by means of pliers.

Thus, three advantages can be obtained:
(1) Dramatic reduction in the cost of the frame.
(2) Frame constructed so as to be reliable in operation, due to the avoidance of soldering.
(3) Simplified assembly.

Two forms of embodiment of the invention are illustrated in FIGURES 1 to 5 of the drawings, wherein:
FIGURE 1 is a view, partly in section, of a thermostatic valve;
FIGURE 2 is a side view of the valve of FIGURE 1 partly in section;
FIGURE 3 is a plan view in section through a bridge forming a spring support;
FIGURE 4 is a view, partly in section, of another form of a thermostatic valve;
FIGURE 5 is a plan view on to an abutment disc, in section through the struts forming a spring support.

The thermostatic element of the thermostatic valve includes an integral disc like member $1a$.

This member is adjoined at one side by an expansible material container $1b$ and at the other side by a valve stem $1c$. The hollow valve stem surrounds a forcibly axially displaceable plunger $1d$ which projects from the valve stem. A resilient means in the form of a cylindrical coil-type compression spring 2 which surrounds the expansible material container $1b$ concentrically, presses the valve member $1a$ to seat against a valve seat $3a$ in the form of an annular disc to seal it. The closing spring 2 bears at one end, against the valve member and is located there against by a boss on its member; at the other end it bears against a bridge $3b$ which forms the spring support and adjoins the valve seat ring on the lower side thereof. The bridge $3b$ has a circular opening concentric with the valve axis for guiding the cylindrical expansible container $1b$, the raised rim $3c$ forming at the same time centering means for the closing spring. One side of the bridge $3b$ is cut away to define with the opening a U-shaped slot having the width of the diameter of the opening. At the non-cut away side, the bridge has an edge bead $3d$ for stiffening purposes, the bead being preferably directed upwardly like the rim of the opening, so that it co-operates in centering the closing spring.

Above, the valve seat ring $3a$ is adjoined by a frame in the form of a bridge $3c$ which at its underside comprises a recess $3f$ situated concentrially to the valve axis and serving as an abutment for the push pin $1d$.

The two bridges $3b$ and $3e$ are so arranged at the valve seat ring with which they are integral, that the outer region of the annular disc 3a projects slightly as a mounting flange for the entire thermostatic valve.

When assembling the valve, first of all the closing spring is fitted over the expansible material container. Pliers with U-shaped jaws are then used to compress the spring, one jaw engaging below the closing spring whilst the other jaw bears on top of the valve disc. The valve element with the compressed closing spring is then introduced with the plunger leading obliquely from below through the valve opening and is brought into the correct concentric position. After the removal of the pliers, the valve disc bears against its seat and the lower end of the closing spring against the bridge 3b.

The support in another embodiment is no longer made continuous from one strut to the other i.e. no longer constitutes a bridge. On the contrary, the spring abutment is formed by a washer 4 which is hooked into the support i.e. struts 3g which adjoin the underside of the valve seat ring 3a and are integral therewith. The spring and the washer together form the resilient means. In fact, the struts 3g each terminate at their lower end in an inwardly directed hook 3h, said hook engaging in each case in a slot-like hole on the edge of the washer 4. The washer 4 has at its central opening a raised rim for the guiding of the valve element at its lower portion, forming the expansible material container 1b. The raised rim serves at the same time for centering the closing spring 2. During assembly, the pliers engages below the closing spring 2 including the washer 4 and presses both against the valve disc 1a. Otherwise, assembly is carried out as described in the first embodiment.

When heating occurs, the expansible material within the thermostatic element causes longitudinal displacement of the plunger 1d which, however, encounters resistance in the recess 3f of the upper bridge 3e. Consequently, the valve member 1a connected to the valve stem lifts away from its seat 3a whilst the closing spring is further compressed.

Upon cooling, the expansible material contracts and enables the push pin to withdraw under the indirect pressure of the closing spring; in this way the valve closes again.

The frame-like part can be made in one piece from metal or a synthetic plastic material.

We claim:

1. A thermostatically controlled valve comprising a thermostatic element having a disc-like valve member and a plunger whereby the disc-like valve member is forcibly moved away from said plunger at a predetermined temperature, a housing enclosing said element, said housing having a ring-like valve seat for closure by said disc-like valve member, a frame on one side of said seat against which said plunger bears to displace said valve member from said seat at said predetermined temperature, said frame bridging said seat and having a recess for receiving said plunger, and bridge-like support means on the other side of said valve seat, said support means defining a U-shaped slot into which a lower end of said thermostatic element can be slid, said valve seat, frame and support means being integrally formed with one another as parts of said housing; and a compression spring removably mounted on said support means and bearing at one end on said support means and at its other end bearing on said disc-like valve member for urging said disc-like valve member against said seat.

2. A thermostatically controlled valve according to claim 1 wherein said ring-like valve seat includes an outer flange for mounting the thermostatically controlled valve on a support.

References Cited by the Examiner

UNITED STATES PATENTS 2,857,105 10/58 Drapeau _____ 236—34

EDWARD J. MICHAEL, *Primary Examiner*.